Figure 1:
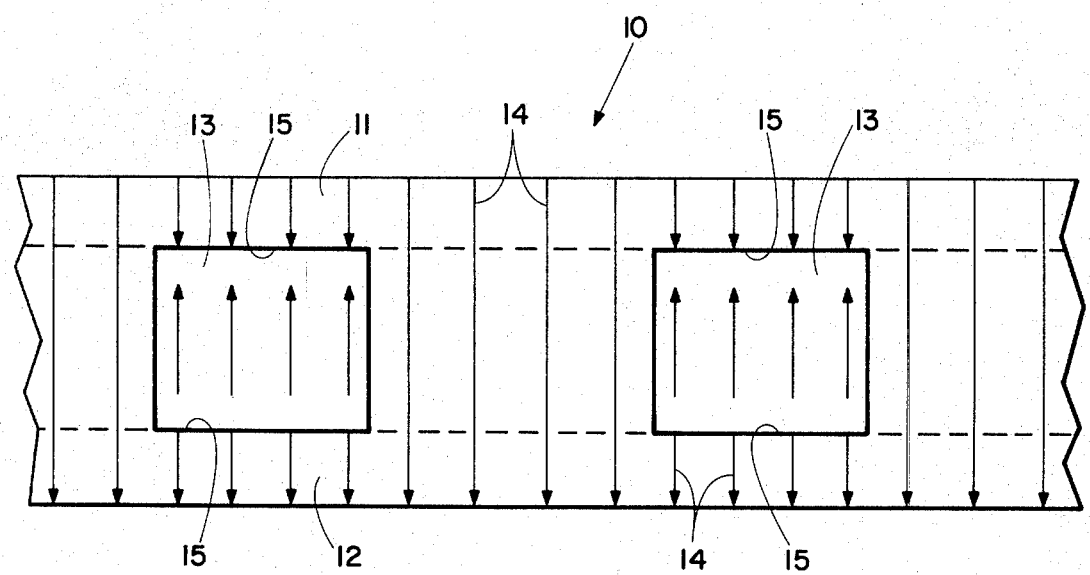

United States Patent [19]
Lucas

[11] 3,726,049
[45] Apr. 10, 1973

[54] METHOD OF PRODUCING MAGNETIC BUBBLE DOMAIN DEVICES

[75] Inventor: John Martin Lucas, Ottawa, Ontario, Canada

[73] Assignee: Bell Canada-Northern Electric Research Limited, Ottawa, Ontario, Canada

[22] Filed: Sept. 30, 1971

[21] Appl. No.: 185,331

[52] U.S. Cl. ........................................... 51/323
[51] Int. Cl. .......................................... B24b 1/00
[58] Field of Search .................... 51/281, 317, 318, 51/323, 324

[56] References Cited

UNITED STATES PATENTS 2,618,108  11/1952  Richardson ..................... 51/216 R
2,053,475   9/1936  Gredys ............................... 51/294

*Primary Examiner*—Donald G. Kelly
*Attorney*—Sidney T. Jelly

[57] ABSTRACT

Surface layers of platelets of magnetic bubble domain material are polished while the platelet is subjected to a magnetic field. Considerably lower value magnetic fields are used, compared with conventional methods in which the platelets are exposed to high value magnetic field after polishing.

6 Claims, 2 Drawing Figures

METHOD OF PRODUCING MAGNETIC BUBBLE DOMAIN DEVICES

The invention relates to magnetic bubble domain devices, and in particular to the production of magnetization of desired orientation in surface layers of platelets of magnetic bubble domain material.

In the production of magnetic bubble domain devices, a wafer or platelet of suitable material, for example a rare earth orthoferrite, is polished on both surfaces. In use a bias field is applied to enable stable magnetic bubble domains, hereinafter referred to as magnetic bubbles, to be generated and propagated in the platelet.

It is possible to produce self-biasing surface layers on such platelets, the device being of the form in which the platelets have a surface coercivity such that the magnetic bubbles are contained entirely in the core layer - not extending into the surface layers. By saturation of the surface layers in a magnetic field of the correct polarity of self-biasing magnetic field can be produced by means of the surface layers, the field providing some or all of the bias field necessary for stable magnetic bubbles.

To produce the magnetized layers it is necessary to apply a high magnetic field, for example several kilo Oersteds. Another way is to cool the platelets from above the Curie temperature in somewhat lower value magnetic fields.

The present invention provides for the production of magnetized surface layers whereby considerably lower value magnetic fields are used, for example of the order of 100 Oersteds. The magnetic field is maintained while polishing the surface layers. By this means the surface layers have a domain configuration as required.

A further feature of the invention is that a platelet can have its surface layers produced with the magnetization of the layers of opposite polarity.

Thus in accordance with one feature of the invention a method of producing platelets of magnetic bubble material comprises the steps of positioning a platelet in a magnetic field of desired polarity, and polishing a surface of the platelet while exposed to the magnetic field.

In accordance with a further feature of the invention both surfaces of a platelet are polished while the platelet is exposed to the magnetic field.

In accordance with yet another feature of the invention the magnetic field during the polishing of one surface is of opposite direction to the magnetic field during polishing of the other surface.

In accordance with yet another feature of the invention a magnetic bubble domain device comprises a platelet of magnetic bubble domain material having high coercivity surface layers, the layers having a magnetization of opposed direction.

Figure 2:
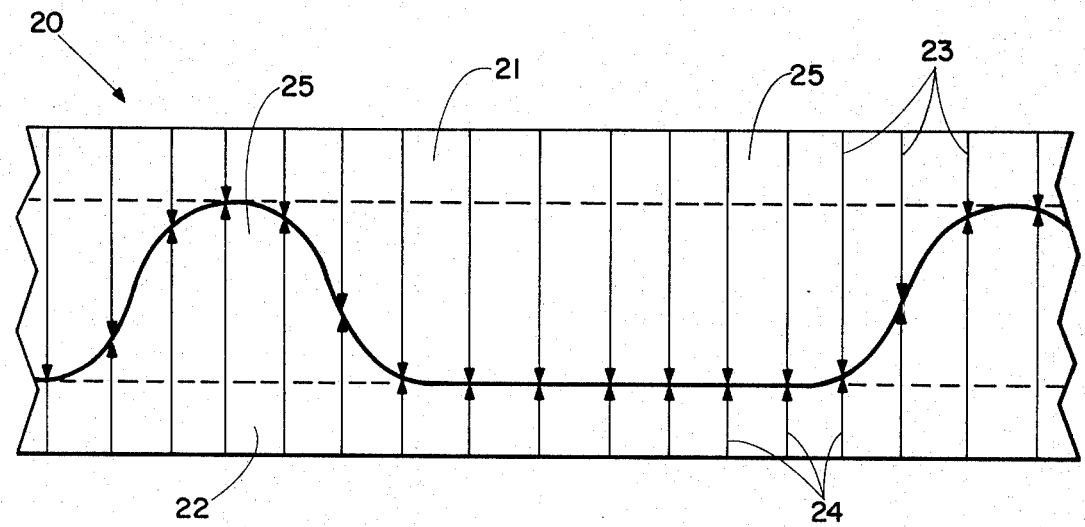

The invention will be understood by the following description of certain embodiments, by way of example, in conjunction with the accompanying drawings which are diagrammatic cross-sections of two platelets, wherein:

FIG. 1 is of a platelet with surface layers having magnetization with the same direction; and FIG. 2 is of a platelet with surface layers having magnetization with opposed direction.

In a platelet of magnetic bubble material single wall domain patterns are formed, the pattern being variable by the application of an external biasing magnetic field. By application of a suitable field the domain can be caused to become "bubbles," that is cylindrical areas of a particular magnetic polarity. This is well known.

To permit satisfactory propagation of magnetic bubbles it has hitherto been necessary to prepare the platelets so that the surface layers have a very low coercivity —desirably less than 0.1 Oersted— and that the surface layers be free from any imperfections —such as scratches— as such imperfections prevent satisfactory propagation of the magnetic bubbles. Even with carefully controlled polishing, handling of the polished platelets, or wiping with a cloth, can produce fine scratches which make the platelet unsuitable.

To produce self-biasing surface layers the prepared platelets are positioned in a high magnetic field — usually of the value of several kilo-Oersteds— the field being normal to the platelet surfaces. The object is to saturate the surface layers. Also cooling from above the Curie temperature in magnetic field of a somewhat lower value can be used. It is often difficult, or inconvenient, to provide the high value fields for satisfactory saturation, and also forming and maintaining a magnetic field while cooling a platelet is inconvenient. Also, when prepared by such methods the bias field in each surface layer of a platelet is of the same polarity.

By the present invention the need for high value magnetic fields, or the cooling in relatively high magnetic fields, is obviated. The platelets are polished in a conventional manner, for example with chrome-oxide, while positioned in a magnetic field of relatively low value, for example of the order of 100 oersteds. The field applied is one which produces in the core layer the domain configuration which is required in the surface layer. This configuration is required by the surface layer during polishing. As previously stated, generally the desired domain configuration or pattern, corresponds to magnetization of the whole in a single direction, that is as a single domain, but other configurations can be produced by suitably adjusting the magnetic field. The domain configuration is first produced in the core layer, and while the configuration is maintained the surface layers are polished. Less than 1 micron thickness need be removed in many cases. After removal of this layer the new surface layer assumes the domain configuration originally formed in the core layer. After removal from the magnetic field the surface layers retain a magnetization which exerts a biasing effect on the internal domain configuration in the core layer.

FIG. 1 illustrates diagrammatically to a greatly enlarged scale, a platelet 10 having surface layers 11 and 12. The surface layers 11 and 12 have been polished while the platelet was positioned in a magnetic field which was of a value sufficient to produce magnetic bubbles —indicated at 13. After the polishing was completed the platelet was removed from the magnetic field, the layers retaining a saturated magnetization as indicated at 14. The biasing effect of the domain walls associated with the layers, indicated at 15, was of a value sufficient to maintain the magnetic bubbles 13 in a stable condition. The magnetic bubbles 13 are readily propagated by any normal method, such as by a permalloy drive pattern, or a conductor circuit on a surface of the platelet. Usually the surfaces of the platelet 10 are polished individually, but can be polished simultaneously if a suitable polishing device is available.

By polishing the surfaces individually, the surface layers can be given magnetizations of opposed direction. Such a platelet is illustrated in FIG. 2. The platelet 20 has surface layers 21 and 22 which were polished sequentially while the platelet was positioned in a magnetic field. The magnetic field was in one direction —normal to the platelet surfaces— while one surface was polished, and the field was in the other direction while the other surface was polished. This is readily obtained merely by turning the platelet over while the magnetic field is maintained in the same direction. As a result the magnetization of the surface layer 21 is in the opposite direction to the magnetization of the surface layer 22, as indicated at 23 and 24 respectively. With opposed surface magnetization the magnetic bubbles are not of cylindrical form but of a form which is circular in plan form —as viewed normal to the platelet surface— and of form somewhat hump-shaped when viewed in cross-section parallel to the platelet surface, as indicated at 25.

It is possible, by means of the invention, to produce platelets with self-biasing surface layers, the self-biasing property being produced at intermediate stages during platelet polishing. The lower magnetic fields necessary may be more readily applied during these stages. The high magnetic fields normally required are not necessary and production is easier and cheaper. Platelets in accordance with the invention are easily manufactured, and retain the advantage that the surface finish does not have to be to the very high standards required for conventional platelets.

The invention can be applied to all magnetic bubble domain material which exhibit the surface layer effect, that is having some magneto-strictive effect. This effect may be inherent in the material or may be as a result of deliberately providing for impurities which will result in a magneto-strictive effect.

What is claimed is:

1. A method of producing magnetic bubble domain devices, comprising the steps of positioning a platelet of magnetic bubble domain material in a magnetic field of desired polarity normal to the platelet surfaces, and polishing a surface of the platelet while the platelet is exposed to the magnetic field.

2. A method as claimed in claim 1, the magnetic field of a value sufficient to produce a desired domain configuration in the core layer of the platelet prior to polishing said surface.

3. A method as claimed in claim 2, the magnetic field of a value sufficient to produce a single domain in the core layer.

4. A method as claimed in claim 1, both surfaces of the platelet being polished while the platelet is exposed to the magnetic field, to produce magnetization of the surface layers of the same direction.

5. A method as claimed in claim 1, one surface of the platelet polished while the platelet is exposed to a magnetic field of a first direction, the other surface of the platelet polished while the platelet is exposed to a magnetic field of a second direction opposite to the first direction, relative to said platelet whereby the surface layers are magnetized in opposed directions.

6. A method as claimed in claim 2, the magnetic field of a value of the order of 100 Oersteds.

* * * * *